United States Patent [19]

Daly et al.

[11] Patent Number: 4,507,789
[45] Date of Patent: Mar. 26, 1985

[54] YAG LASER SYSTEM

[75] Inventors: Richard T. Daly, Huntington; Walter Rhoades, Port Jeff Sta; Harvey Stone, Flushing; Robert A. Kaplan, Huntington Station, all of N.Y.

[73] Assignee: Quantronix Corporation, Smithtown, N.Y.

[21] Appl. No.: 307,148

[22] Filed: Sep. 30, 1981

[51] Int. Cl.³ .............................................. H01S 3/08
[52] U.S. Cl. ....................... 372/92; 372/35; 372/61
[58] Field of Search ............ 372/35, 36, 18, 20, 372/92, 34, 61

[56] References Cited

U.S. PATENT DOCUMENTS

| 3,599,113 | 8/1971 | Cremosnik | 372/36 |
| 3,638,140 | 1/1972 | Knapp | 372/35 |
| 3,659,220 | 4/1972 | Erickson | 372/35 |
| 4,150,341 | 4/1979 | Ferguson | 372/35 |
| 4,232,276 | 11/1980 | Iwata | 372/35 |

OTHER PUBLICATIONS

Belostotskiy et al., "Vortex-flow Cooled Laser"; Sov. Jour. of Optical Tech., vol. 35; Jul.-Aug., 1968, pp. 450-452.

Primary Examiner—William L. Sikes
Assistant Examiner—Léon Scott, Jr.
Attorney, Agent, or Firm—Kane, Dalsimer, Kane, Sullivan and Kurucz

[57] ABSTRACT

A reliable, low cost, light weight, CW pumped Nd:YAG laser with optional Q-switching is provided with a rail for the laser optics that isolates the optical axis from movement of the laser head housing. A laser pot is provided with a housing and quickly detachable cover both molded of a resin that is impervious to water, optically opaque, possesses low thermal deformation, high dielectric strength and resistance to damage by light and UV radiation. The pot is formed with a cavity lined by molded reflectors and divided by a septum interposed between the laser rod and lamp. The lamp is removable with the cover and is readily coupled with the lamp sockets designed for accepting variations in lamp manufacturing tolerances. The power supply for the laser resonator is transformerless and parallel triggering is employed for the lamp. The cooling system is provided with a water immersed heat exchanger defined by a coated copper tube that prevents ionic action.

16 Claims, 14 Drawing Figures

YAG LASER SYSTEM

SUMMARY OF THE INVENTION

A principal object of the present invention is to provide a laser that is low cost, light weight, simple, sturdy, economical to operate in a reliable fashion and easy to maintain as an industrial tool.

Another object is to provide a moisture, temperature, and dust resistant laser with its optics on a rigid rail which is semi-kinamatically attached to a protective enclosure, so that vibration, twisting forces, impact and other rough handling will not detrimentally effect alignment of the laser.

A further object is to provide a YAG laser of the foregoing type with a transformerless power supply as well as parallel triggering of the lamp for exciting the YAG rod.

Still another object is to provide a laser of the foregoing type with a laser pot for the YAG rod and lamp that is molded of a resin material that is impervious to water, optically opaque, possesses low thermal deformation, high dielectric strength and resistance to damage by light and UV radiation.

A still further object is to provide a laser of the foregoing type with a laser pot having a cavity for the rod and lamp that is provided with molded reflectors.

Yet another object is to provide a laser of the foregoing type with a connection means for the lamp that facilitates easy removal of the lamp with the laser pot cover and coupling with the lamp sockets.

DETAILED DESCRIPTION OF THE INVENTION

Figure 1:
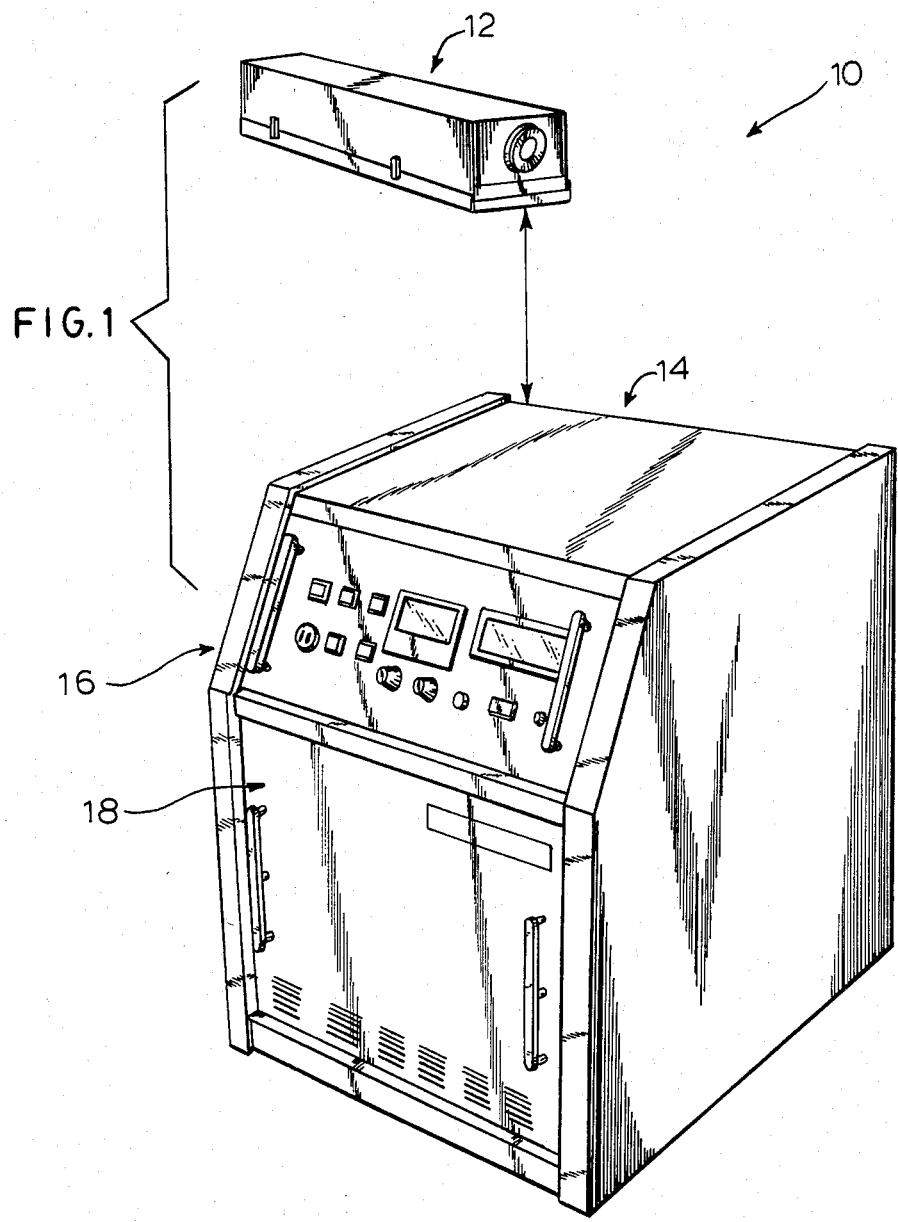
FIG. 1 is a perspective view of the laser of this invention showing the laser head unit and electrically and hydrualically connected cabinet in which is contained the power supply and cooling system.
Figure 2:
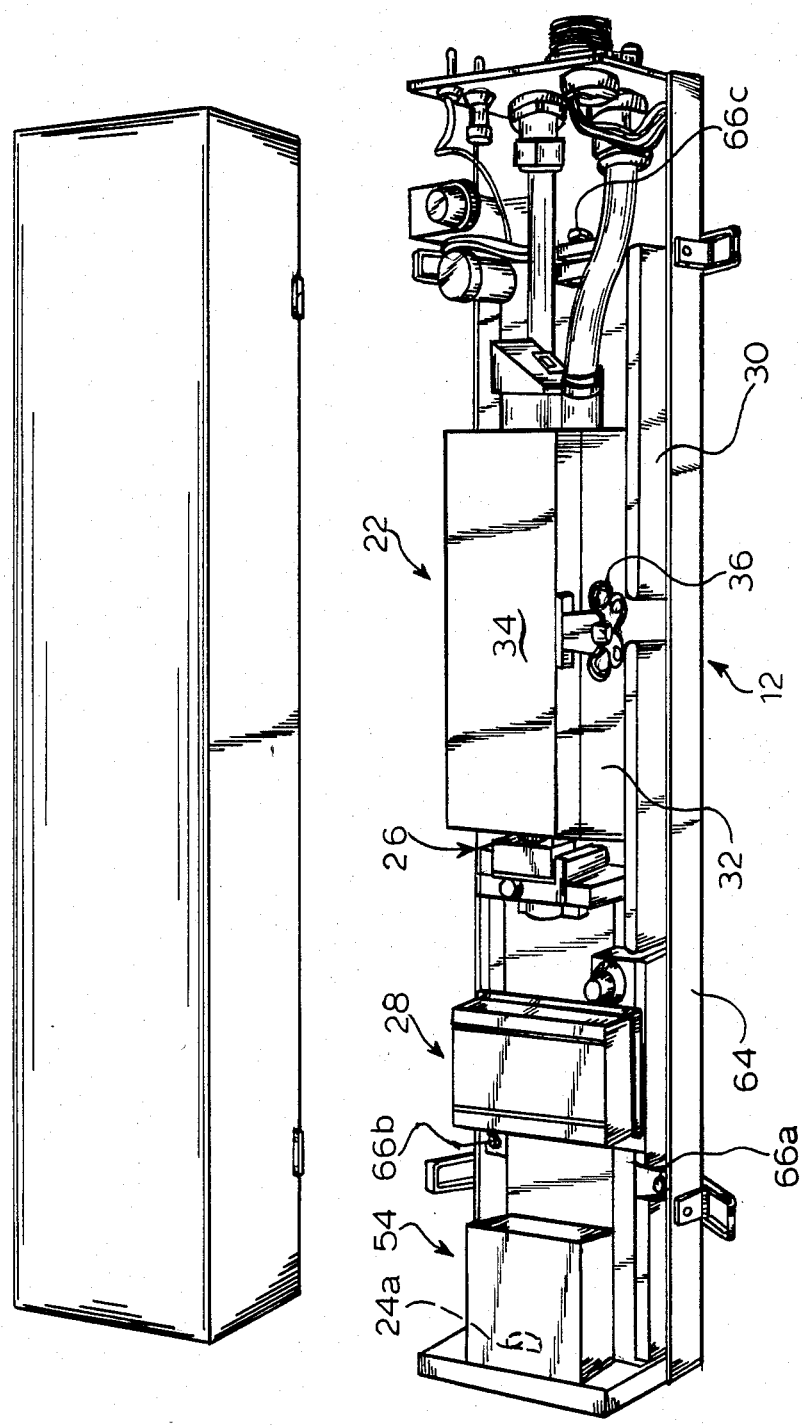
FIG. 2 is a front perspective view of a laser head unit according to the invention with the housing cover shown removed.
Figure 3:
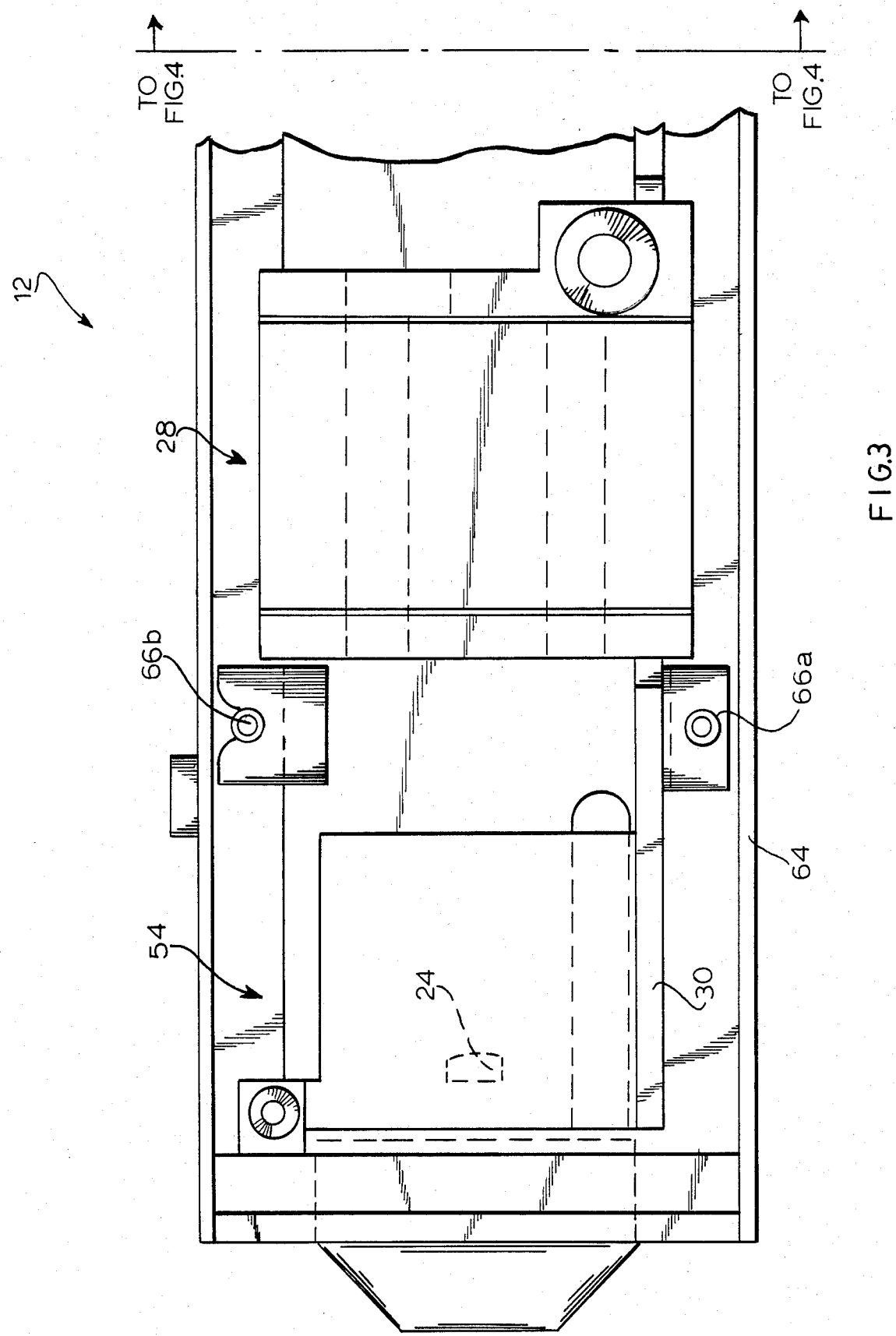
FIGS. 3, 4 and 5 when connected as shown is a top plan view of the laser head unit with the housing cover removed.

The present invention provides a reliable, light weight, low cost laser 10 comprising a portable laser head unit 12 and a mobile cabinet 14 including power supply 16 and cooling system 18. The laser head 12 provided by the invention includes a laser pot 22, mirrors 24a–24b, mode selector 26 and Q-switch 28 supported on a rigid rail 30. Although the system operates without a Q-switch, the specific embodiment disclosed herein is shown as being operational with a Q-switch 28.

LASER POT

The laser pot 22 contains a housing 32 and cover 34, with two quick-release latches 36 holding the cover 34 in place while permitting quick access to the interior of the housing 32. The cover may be removed for periodic lamp changes. In actual practice, it only takes approximately 15 seconds for a lamp change with no tools required, as a result of the quick release latches 36 and lamp mounting seats 48 and 50. An Nd-YAG rod 38 and a krypton-arc pump lamp 40 enclosed within gold plated elliptical reflectors are also within the housing 32. Both the housing 32 and cover 34 are provided with mating reflector halves 42, 44, respectively. Each reflector not only serves the function of reflecting light, but also serves to complete the water path described below. The reflector halves 42 and 44 are conveniently molded of resin, possessing properties that render them readily moldable and platable to a high finish. In this connection, the reflector halves are metalized by applying gold plate thereto. The molding of the reflectors of the present invention permits the reduction in cost of such parts by approximately one-half. When the reflectors 42 and 44 are coupled to one another they are light tight.

Both the housing 32 and cover 34 are molded from a suitable inexpensive resin material that possesses properties of relatively low thermal deformation, high dielectric strength, imperviousness to water, optically opaqueness, resistance to damage by light and UV radiation. It has been found that a satisfactory material is a mineral loaded phenolic thermosetting resin. The housing and cover according to the present invention cost approximately one-fifth of the typical machined housing of the prior art.

A glass septum 46 is located midway between the pump lamp 40 and laser rod 38 and separates the cooling water into two channels. The septum 46 is attached to the upper cover 34 and specifically the cavity reflector halve 44 and is removed with the cover when changing the lamp 40. By proper choice of spectral properties, septum 46 permits only that light useful in pumping the rod to be transmitted from the lamp to the rod.

The pumped Nd:YAG rod and the two mirrors 24a–24b form the basic laser unit. The adjustable mirror 24a is curved. The fixed mirror 24b is flat and is provided by and defined by a coating applied to the end of the YAG rod 38. The other end of the YAG rod is curved. When the mirrors are parallel to each other they form an optical resonator. Because the rod and the mirrors have circular cross sections, emitted radiation will be substantially symmetrical and in distribution with respect to the resonator axis.

The construction of laser pot 22 reduces maintenance time while effectively housing and clamping the contained components in a leak-proof manner. Most significantly, no separate water jackets are required as is the case with prior art systems with the jackets requiring much larger housing. In this connection, the laser pot is relatively small and provides for compactness. The design of the water flow path permits relatively high linear velocity providing turbulent flow for optimum cooling.

A further advantage of the present invention is the removal of the lamp 40 for replacement from the top. The lamp electrode and attachment system fixes the position of the electrodes and consequently the lamp without plug-in-type of connectors. One of the connections to lamp 40 is defined by a conical shaped seat 48 while the other is provided by a cylindrical seat 50. The conical seat 48 axially fixes one end of the lamp while the cylindrical seat 50 adapts to length tolerances of the lamp occurring in manufacture. Two spring fingers 51a, 51b attached to the top cover 34 act to press the spherical ball 52 on the lamp electrodes firmly into the supports when the cover is fixed onto the housing 32.

The present invention deploys two light springs 53 loosely attaching the lamp 40 to the cover 34 in such a way that when the cover 34 is installed, the light springs play no role in positioning the lamp (the position of the lamp as previously explained is done by the ball and supports 48 and 50 as previously described). However, when the cover 34 is removed, the light springs retain the lamp 40 loosely in such a way that it comes away with the cover 34 and then can easily be plucked from the springs 53.

The light springs mounted on the cover 34 also facilitates the removal of the new lamp 40 from its protective box. In this fashion, replacing the pot cover 34 onto the pot housing 32 completes the lamp change. Thus, this whole procedure has three main advantages:

A. minimizes lamp strain and possible explosion;
B. obviates need for touching a lamp with fingers thus risking applying finger grease to sensitive envelope surfaces; and
C. when carefully done, provides a solid barrier (pot cover 34) between the lamp 40 and the operator's eyes during lamp change (pot cover should always be held with lamp facing away from the eyes of the operator).

ADJUSTABLE MIRROR BLOCK

The adjustable mirror block 54, not only conveniently mounts mirror 24a but polarizer 58 and shutter 60. The output mirror 24a position is adjustable along horizontal and vertical axes and the attachment of the mirror 24a to the mirror holder 61 facilitates the holding, insertion and rotation of the mirror 24a and in this manner serves as a separate tool and holder for mirror mounting and adjustment. Therefore, no tools are required nor is the mirror touched in any fashion in order to clean it or replace it, bearing in mind that the mirror in this type of application is a very delicate optical component. The geometric center of the mirror 24c is located off and is eccentric relative to the optic axis of the laser rod; this permits the mirror to be rotated such that a new reflecting surface can be brought into position as required.

The polarizer 58 forces the laser to oscillate in a single determined polarization and in this connection may be a dualplate Brewster angle polarizer mounted at the top of the mirror block 54. The polarizer 58 is keyed in place and may be removed for examination or cleaning. The shutter 60 consists of a sheet metal "flag" which is mounted to the face of a spring-loaded rotary solenoid in a successful embodiment of the invention.

MODE SELECTOR

Figure 4:
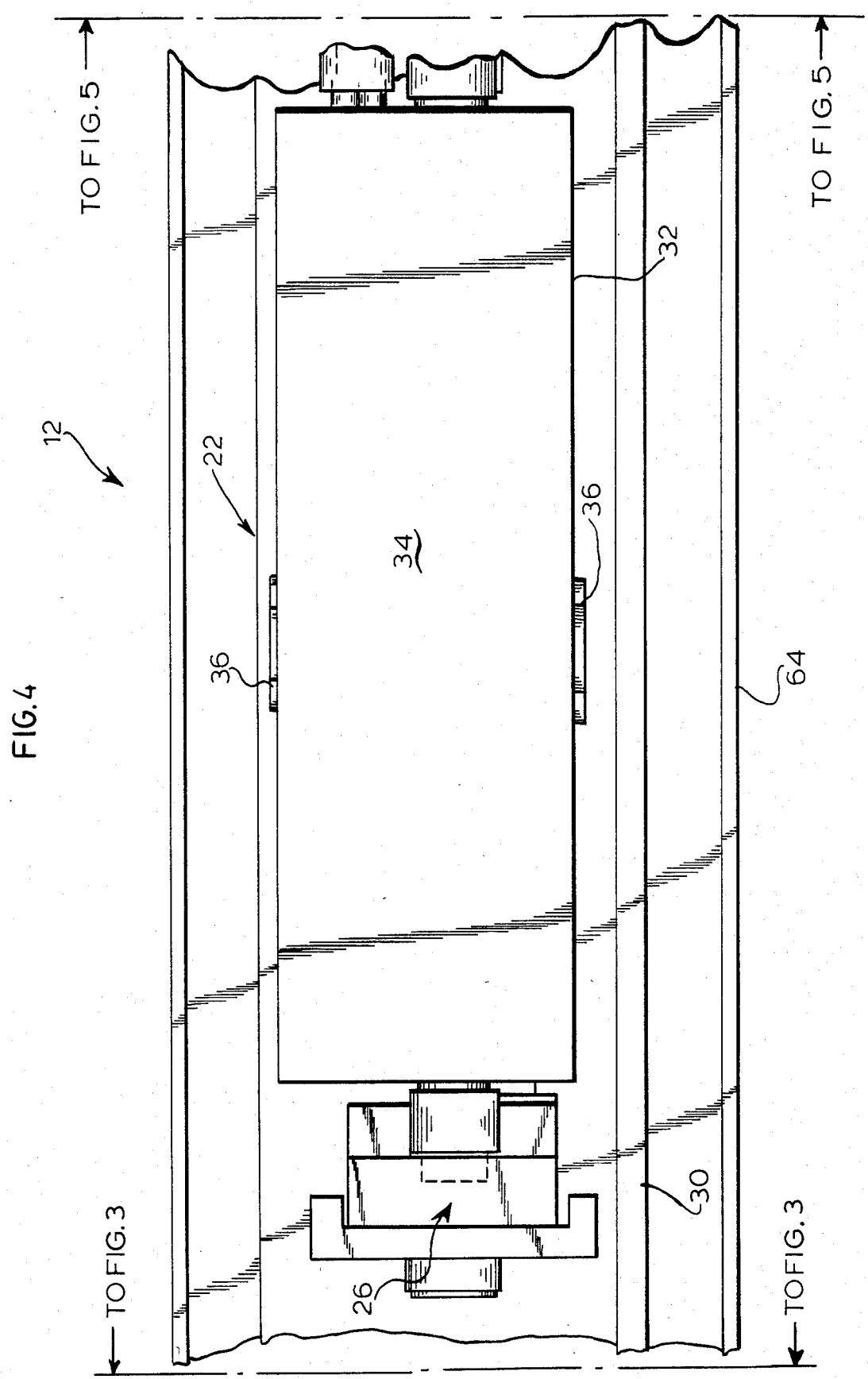
Figure 5:
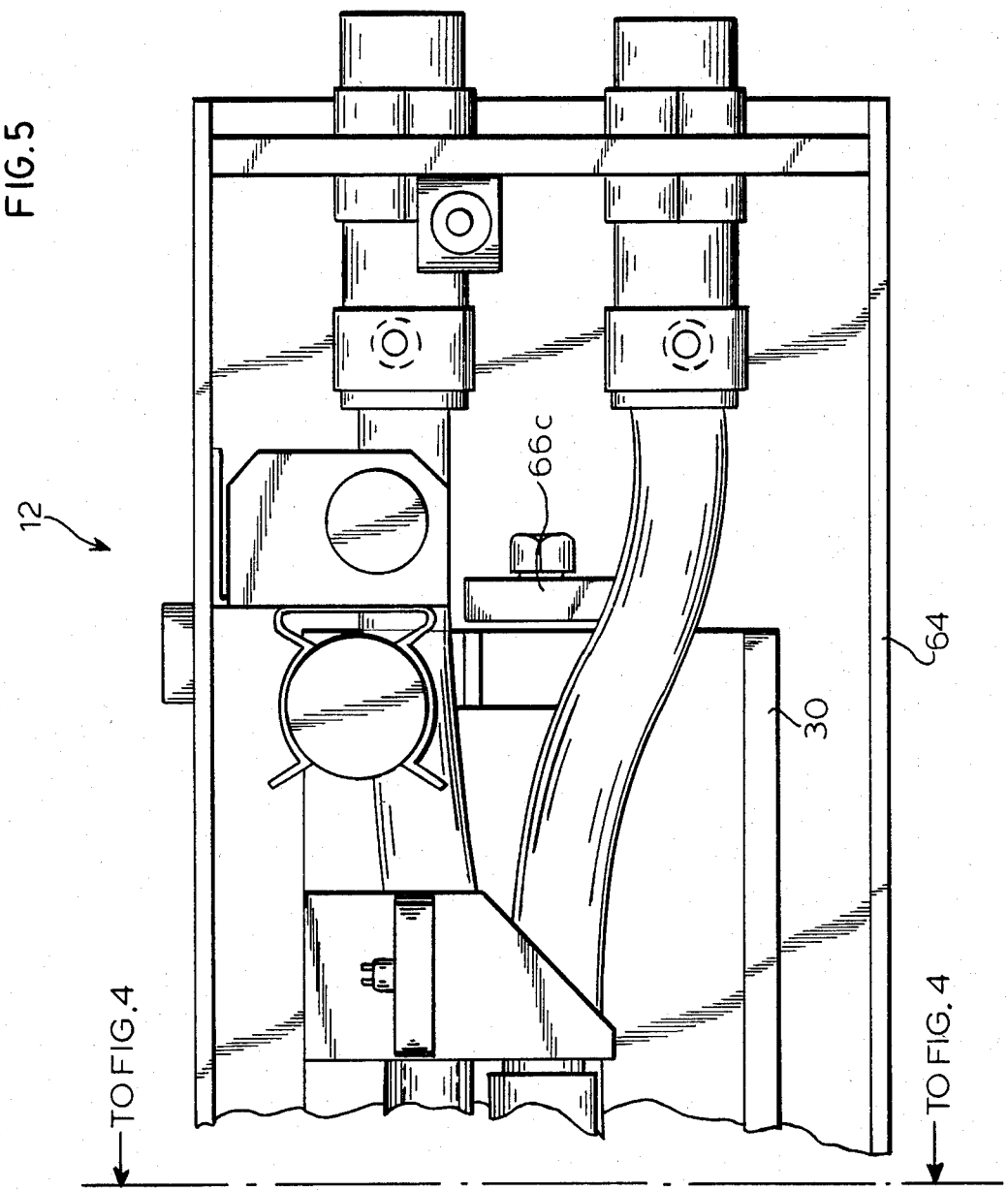
Figure 6:
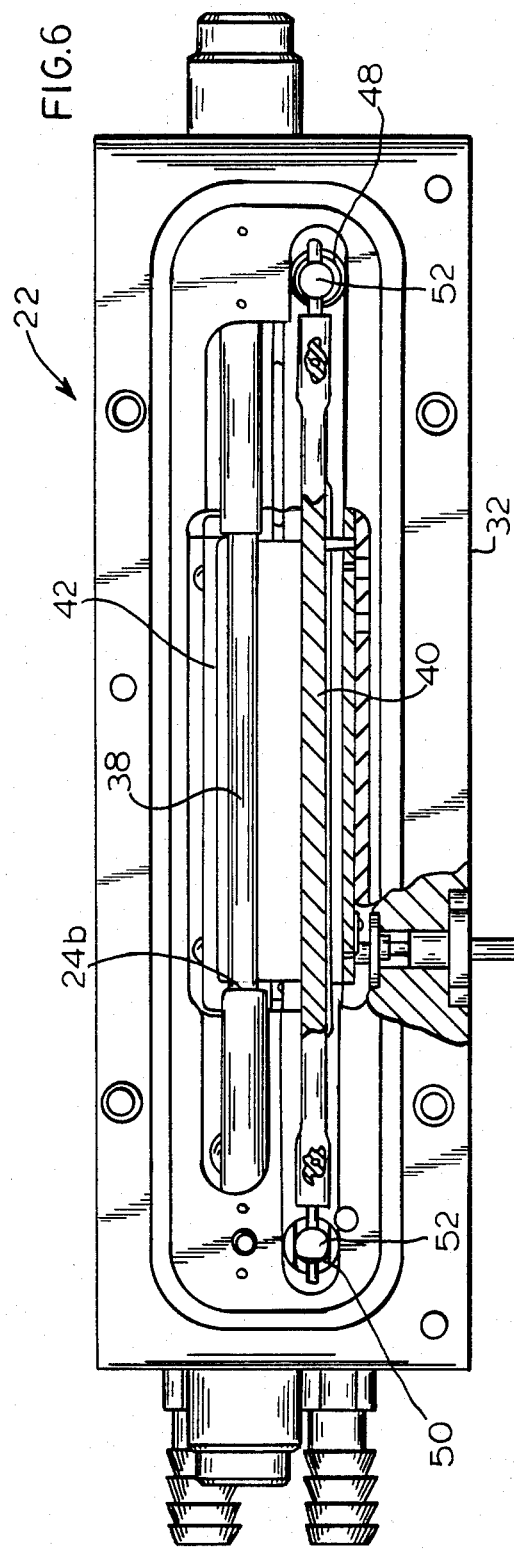
FIG. 6 is a plan view of the laser pot with its cover removed.
Figure 7:
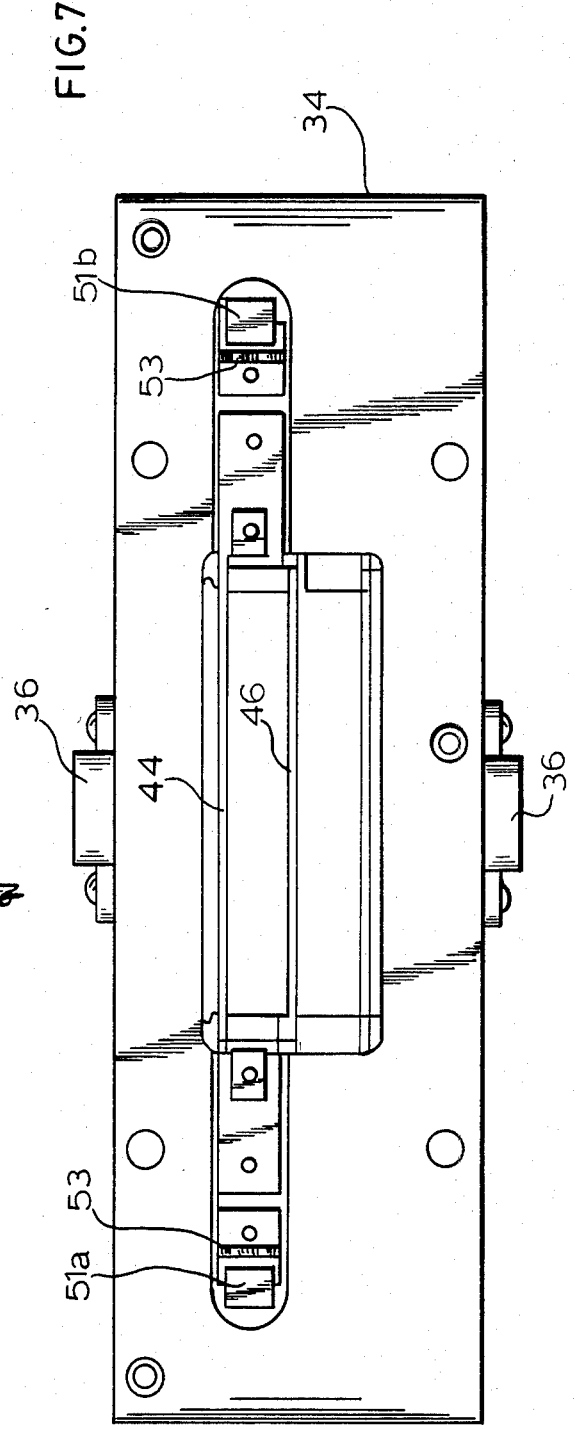
FIG. 7 is a plan view of the cover for the laser pot.
Figure 8:
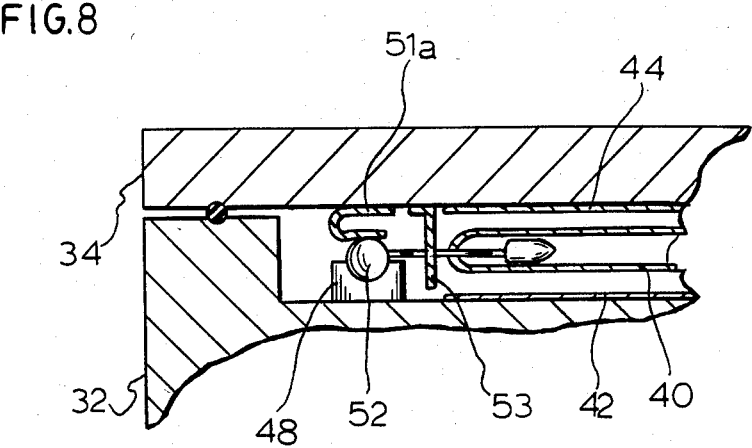
FIG. 8 is an enlarged fragmentary sectional view of the cover coupled with the housing of the laser pot.
Figure 8A:
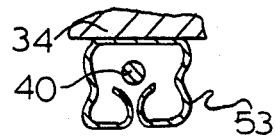
FIG. 8a is an enlarged fragmentary end view of a light spring used to retain the lamp with the cover.
Figure 10:
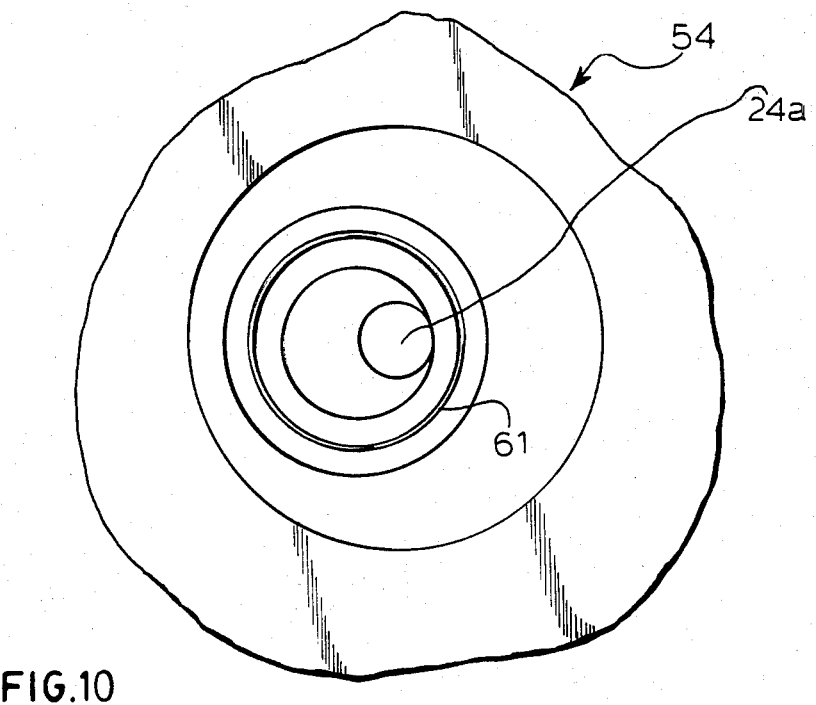
FIG. 10 is an enlarged fragmentary front elevational view of the adjustable mirror mounting block.
Figure 9:
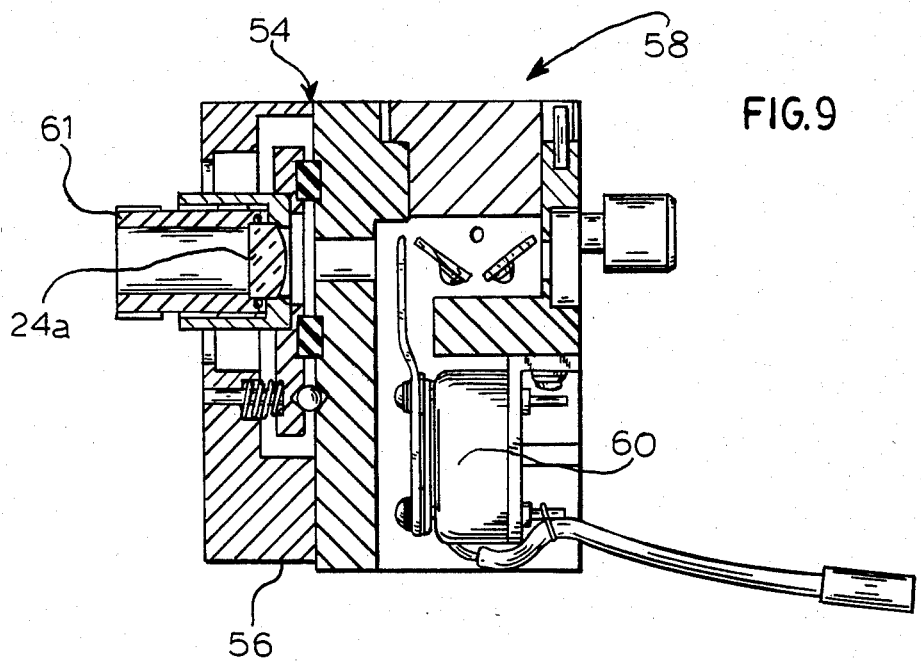
FIG. 9 is a sectional view of the adjustable mirror mounting blow.
Figure 13:
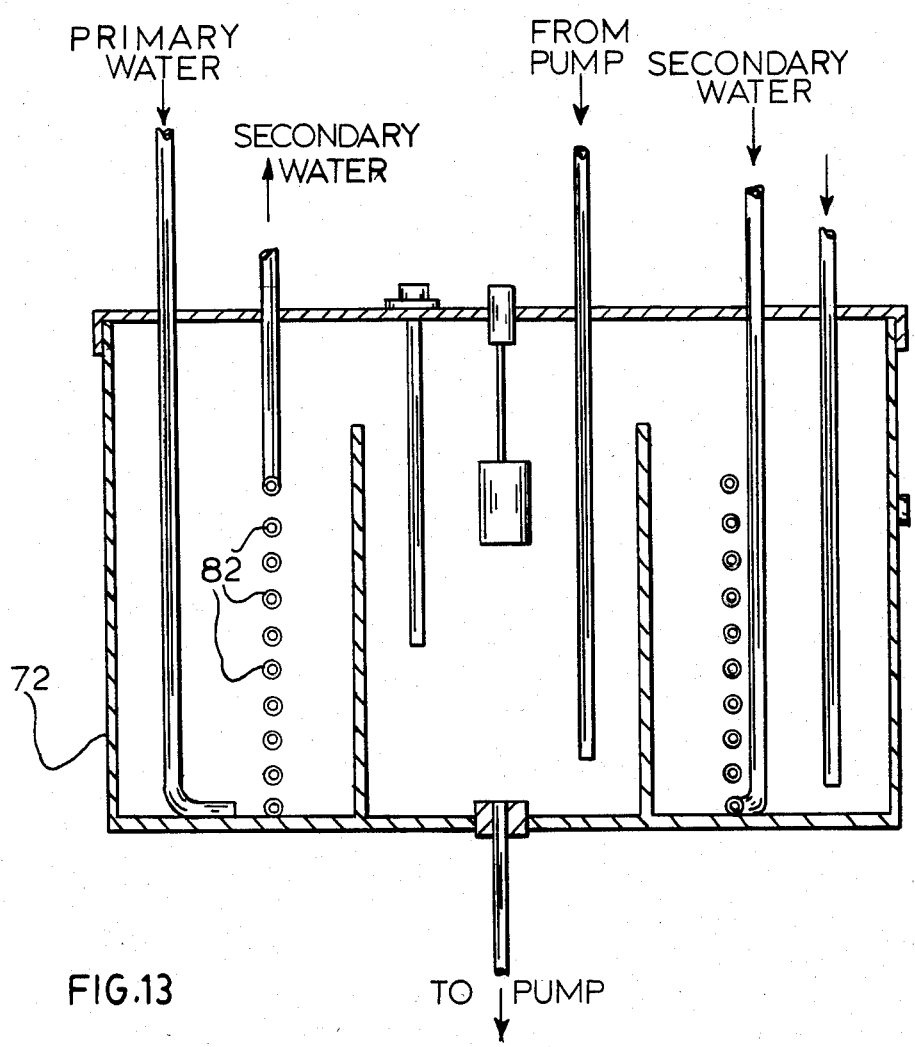
FIG. 13 is an enlarged view of the combined liquid reservoir and immersed cooling coils.

A fixed diameter mode selecting aperture in the mode selector 26 is provided for single transverse mode operation (See FIG. 4). This aperture may be removed by unscrewing it from its mount in the selector 26 after the Q-switch beam tube has been removed. The aperture may be positioned horizontally and vertically in any convenient manner and once the optimum position is obtained the aperture may be locked in position.

There are discrete distributions of the power, called modes, that describe the behavior of the laser. The lowest order or fundamental mode has a gaussian intensity distribution. This mode is also called the TEM-00 mode. If no aperture is employed, the laser will emit radiation in a combination of modes often referred to as multimode which has a relatively uniform distribution. The aperture thus serves to restrict the laser output to the lowest order single mode.

RAIL

Referring to FIGS. 2 to 5, a rail 30 conveniently supports the optical system of the laser and as will be explained isolates it from the laser head housing 64. This rail 30 is relatively stiff and provides a semi-kinamatic mount or support of the laser resonator components. In this fashion, the rail will be permitted movement but not deformation incident to distortion or elongation of the housing 64. Towards this end, the rail 30 is permitted predetermined pivotal and translation movement about 3 points in order to maintain and assure the desired optical axis and proper alignment of the components constituting the resonator thereby rendering them insensitive to twisting or elongation of the housing 64. Thus, the connection 66a permits the rail to move vertically and rotationally but not horizontally with respect to the housing 64. The connection 66b is permitted vertical, rotational and horizontal movement normal to the optical axis of the laser head, but not horizontal movement parallel thereto. The connection 66c is permitted horizontal movement along the axis of the laser head and rotational movement about the axis as well. The rail assures that the optical performance is not effected by distortion of the head or housing.

COOLING SYSTEM

Figure 12:
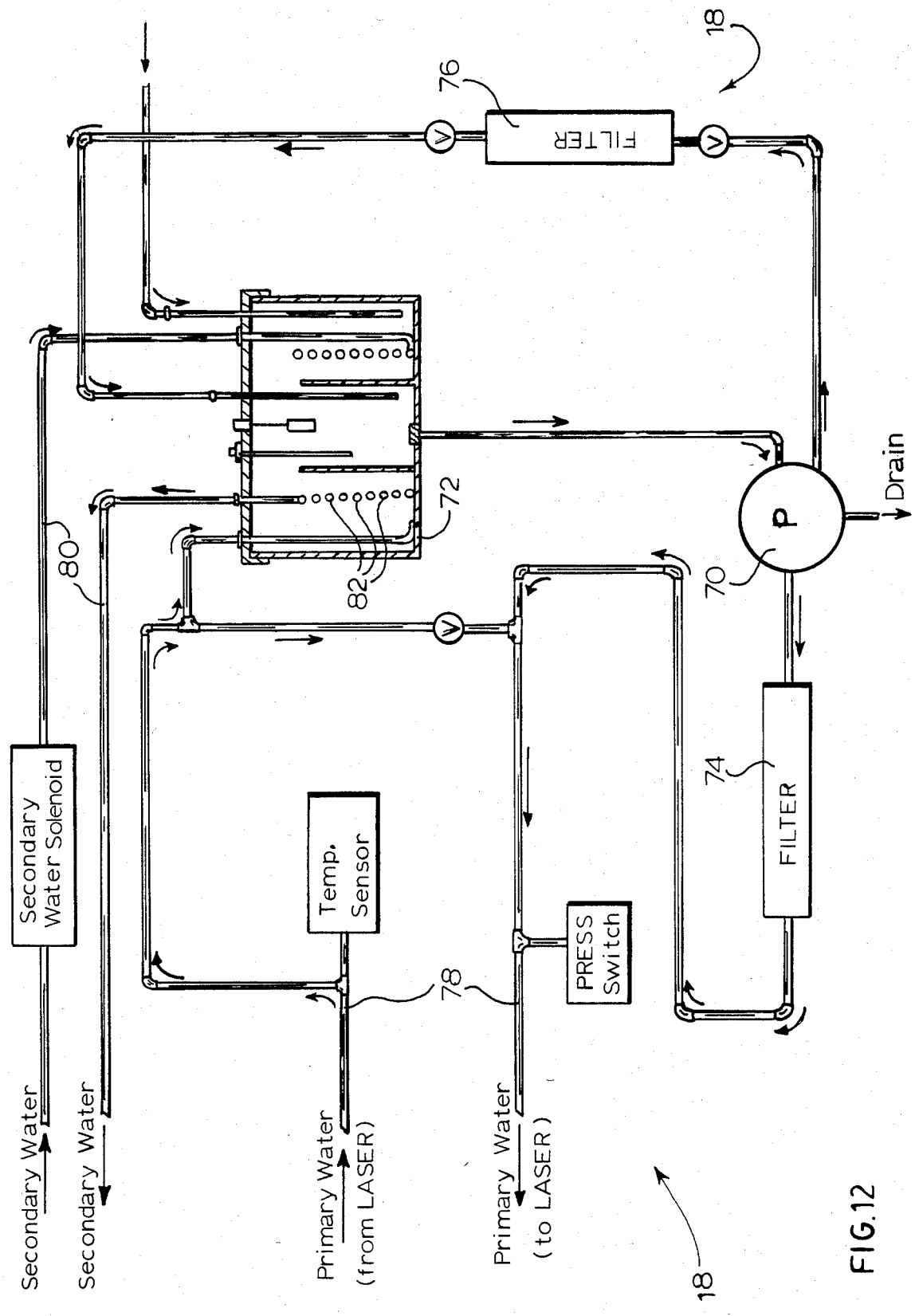
FIG. 12 is a schematic illustration of the cooling system employed according to the invention.

The cooling system contains a water circulation system, and is advantageously housed in the lower section of the laser unit as shown in FIG. 1. The cooling system is schematically shown in FIG. 12 and it includes four main components: (1) a three-phase motor and pump 70; (2) a heat exchanger/reservoir 72; (3) a particle filter 74; (4) a deionizing filter 76. The primary water loop 78 circulates high-purity, demineralized and deionized water through the laser pot 22. Primary loop components are constructed of high corrosion resistant materials. The high electrical resistivity of the water is maintained by a replaceable cartridge-type demineralizer/deionizer filter 76. The secondary water loop 80 brings tap water to the heat exchanger to cool the primary water.

To reduce costs, the heat exchanger is immersed in the reservoir and is provided by helically wound or spirally wound copper tubing 82. Normally copper would contaminate the liquid by ionization. The water must be pure and deionized in order to provide high resistivity. In order to accomplish this the copper tubing is externally coated with a resin suitable for such purposes. A resin that has performed satisfactorily is identified as Vestar supplied by Dow Corning Corporation, Midland, Mich.

Vestar is a non-ferrous metal surface treatment and is a silicone-silica-hybrid material which forms thin, clear abrasion and corrosion resistant coatings on copper, providing properties similar to anodic and other inorganic finishes. Thus, the present invention is able to take advantage of copper tubing having good thermal conductivity characteristics in order to get efficient heat exchange. The interior of the copper tubing as indicated in the above will carry tap or city water.

LASER POWER SUPPLY

Figure 11:
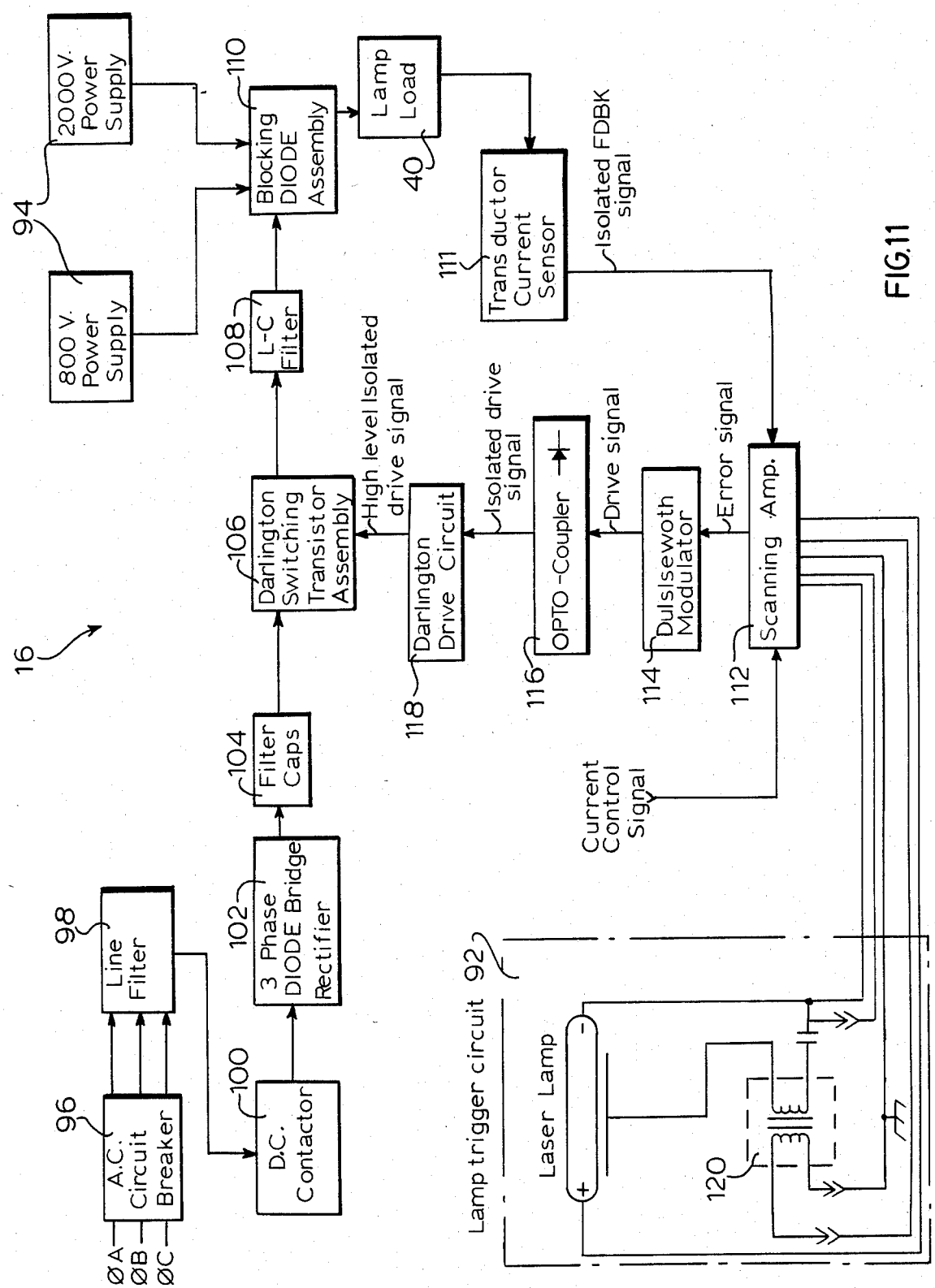
FIG. 11 is a block diagram of the power supply employed according to the invention shown coupled with a voltage supply and lamp trigger circuit.

A block diagram of the laser power supply 16 is provided in FIG. 11 and is advantageously provided by transformerless circuitry, which permits a reduction in weight of from over 200 pounds to as low as 75 pounds. Thus, the supply 16 includes an AC circuit breaker 96, a line filter 98, a DC contactor 100, a three-phase diode bridge rectifier 102, filter capacitors 104, a Darlington switching transistor assembly 106, an LC filter 108, a blocking diode assembly 110 and the lamp 40.

In order to have a transformerless circuit, the current regulating path must be isolated from the control circuits. The transductor current sensor 111 is coupled with the lamp 40 and applies an isolated feedback signal to the summing amplifier 112. The current control signal is applied to a summing amplifier 112 and is applied as an error signal to pulse width modulator 114 from which a drive signal is applied to an opto-coupler 116. In this fashion an isolated drive signal is applied to a Darlington drive circuit 118 which applies a high level isolated drive signal to the Darlington switching transistor assembly 106.

The initial ionization of the lamp 40 is achieved by a parallel triggering circuit 92. In the environment of a CW water cooled laser, parallel triggering is an important contribution of the present invention because of its lower cost, less weight and higher reliability. In FIG. 11 the input trigger pulse is applied across the primary of the transformer 120 and is stepped up from 150 volts to high voltage in the neighborhood of 10 kv.

OPERATION

Laser action is produced by "stimulated emission" from Nd ions "pumped" to an excited state. The process is briefly described below.

The power supply 16 is designed to closely match the operating characteristics of the krypton arc lamp 40. The laser power supply 16 includes three interrelated sections: (1) a high voltage trigger circuit 92; (2) a boost-voltage source 94; and (3) a high-current, regulated DC source as explained. When the supply 16 is turned on, the boost voltages (700 and 2,000 volts) appear across capacitors as the output. A sequence of high voltage pulses (15 kv) from the trigger circuit 92 is injected into the lamp 40 via a transformer 120 in the laser head unit 20. The lamp 40 will usually be ionized after the first or second path pulse. This initiates discharge of the charged capacitors and permits establishment of a sustained arc by the DC source, providing the lamp current. Once the lamp 40 has ignited the trigger circuit 92 and the boost voltages are automatically turned off. Should the lamp 40 fail to ignite, the trigger circuit 92 will de-energize after about 30 seconds. The trigger circuit can be reset by turning the power supply off, waiting 20 seconds and then restarting.

Once the lamp 40 ignites, it undergoes a start-up sequence consisting of several current levels. These may be observed on the front panel meter of the cabinet during start-up. The lamp 40 starts at a low level, automatically increases to a mid-level, and then stabilizes at the level set by a power adjust control on cabinet 14. This sequence normally takes about 12 seconds. An input power meter on cabinet 14 indicates the lamp power. The power supply in actual practice is connected to a main interlock system and will automatically shut down if any interlock fails. The power supply may be restarted as soon as the interlock failure is corrected.

A portion of the light emitted by the krypton-arc lamp 40 is absorbed by the Nd:YAG rod 38 and "pumps" the Nd-ions from the ground state into excited states. The ions release some energy to the host YAG rod 38 as they decay to the upper level of the lasing transition. After participating in the lasing process, the ions release more energy to the rod 38 as they return to the ground state where the absorption of the krypton arc-lamp 40 light repeats the process. This energy, in the form of heat, is removed from the YAG rod 38 by cooling water flowing within the pot 22. Although the cooling water removes heat from the rod 38 efficiently, removal occurs only at the surface so a radial thermal gradient is established within the rod. This gradient causes the rod to act like a lens and the presence of this lens dominates the optical characteristics of the laser resonator. Suffice it to say, as a general rule, the more intense the pump light, the shorter the effective focal length of the rod. It is possible, in some cases, to make the focal length so short that the optical system of the resonator is unstable and no laser output occurs.

As the lamp 40 ages, it may occasionally be necessary to adjust the lamp current to maintain the same lens effect in the crystal. Similarly, some adjustments in lamp current may have to be made when a new lamp 40 or a new rod 38 is installed.

The laser head unit 12 according to a successful embodiment of the present invention is only 26½ inches long, 4 inches high and 6 inches wide. It weighs only 15 pounds and can be easily mounted in the most cramped quarters. The power supply/cooler unit 14 will fit under a standard 30 inch high work bench and is 22 inches wide by 26 inches deep. The power supply drawer may pull out for easy access. The power supply is only about 75 pounds as compared to the laser of the prior art weighing approximately 200 pounds. The cooler filter and deionizer are within easy reach for routine maintenance.

It has been found, the laser of the present invention is highly versatile and capable of performing a wide variety of jobs efficiently, economically and reliably. In this connection, the laser is readily adapted to accomplish the following:

A. below melt threshold—material phase change, annealing or hardening of metals, crystalline structure changes and semi-conductor materials.

B. melt threshold—welding, brazing, cladding, alloying of metals, epitaxial regrowth of semi-conductor materials.

C. above evaporation threshold—vaporizing of materials for cutting, drilling, engraving, trimming, scribing.

Radiation can be produced either continuously or in pulses at repetition rates up to 50 KHz (with the addition of a Q-switch) as explained above.

Thus, the several aforenoted objects and advantages are most effectively attained. Although several somewhat preferred embodiments have been disclosed and described in detail herein it should be understood that this invention is in no sense limited thereby and its scope is to be determined by that of the appended claims.

What is claimed is:

1. A reliable, light weight, low cost YAG laser comprising:
    a resonator cavity including a YAG rod and two mirrors, a lamp for exciting the rod, a laser pot comprising a housing containing the rod and lamp, and a detachable cover for the housing and means for connecting said cover to said housing, said pot housing including connection means for detachably connecting the ends of said lamp, said connection means including a conical socket receiving one end of the lamp and a cylindrical socket receiving the other end of the lamp, the cover including light spring means for receiving the lamp while permitting its mounting in the housing on the sockets and for removal therefrom as the cover is removed from the housing;
    a power supply means coupled with the resonator for supplying power to the resonator; and
    a cooling system coupled with the resonator for cooling the resonator.

2. A reliable, light weight, low cost YAG laser in accordance with claim 1 and further including:
    a septum in said cover for separating said resonator cavity between the lamp and rod, and molded reflectors in said resonator cavity for the lamp and rod, the reflectors being molded elliptical resin members coated with gold.

3. A reliable, light weight, low cost YAG laser in accordance with claim 1 wherein:
    one of the mirrors of said resonator cavity forms an integral part of the rod and the other mirror being spaced from the rod and being adjustable, a mirror mounting block supporting the adjustable mirror, serves as its own tool for adjusting, rotating and removing the mirror.

4. The invention in accordance with claim 3, wherein a mirror mounting block supports the adjustable mirror, and serves as its own tool for adjusting, rotating and removing the mirror.

5. The invention in accordance with claim 4, wherein the mirror mounting block supports the adjustable mirror, a polarizer and a shutter supported by the mounting block.

6. The invention in accordance with claim 5, wherein the geometric center of the adjustable mirrors located off the optical axis of the laser rod permits the mirror to be rotated such that a new reflecting surface can be brought into position.

7. A reliable, light weight, low cost CW pumped Nd:YAG laser comprising:
    a compact laser head unit for generating a laser output comprising an optical resonator including a Nd:YAG rod and two mirrors, a lamp for exciting the rod, a laser pot for mounting the rod and the lamp, the pot comprising a housing containing the rod and lamp and a detachable cover for the housing and means for connecting the cover to the housing, and the pot housing being molded from a resin material that is impervious to water, optically opaque, low thermal deformation, high dielectric strength and resistance to damage by light and UV radiation, the pot including a lamp and laser rod parallel triggering means for the lamp, water means for cooling the lamp and rod, means for providing a flow path over the lamp and rod;
    a power supply means coupled with the resonator for supplying power to the resonator; and
    a cooling system coupled with the resonator for cooling the resonator.

8. A reliable, light weight, low cost CW pumped Nd:YAG laser in accordance with claim 7 and further including:
    a quick disconnect means for connecting the cover to the housing in a liquid tight and light tight manner and for permitting the cover to be quickly removed from the housing for a quick lamp change.

9. The invention in accordance with claim 7, wherein the resin is a mineral loaded phenolic resin.

10. The invention in accordance with claim 7, wherein a septum is between the lamp and rod and separate the cavity therebetween into a path for the water to flow over the lamp and rod.

11. A reliable, light weight, low cost CW pumped Nd:YAG laser comprising:
    a compact laser head unit for generating a laser output comprising a resonator, a housing, a rigid rail, a laser resonator mounted on the rail, and connecting means for connecting the rail to the housing so that the rail and consequently the optical axis of the resonator and the laser is substantially insensitive and independent of any distortion or elongation of the housing, the connecting means including three connectors for the rail to the housing, the first connector permitting vertical movement of the rail relative to the housing, the second connector permitting vertical movement and lateral movement normal to the optical axis of the rail relative to the housing and the third connector longitudinal movement along the optical axis and rotational movement along the optical axis of the rail relative to the housing;
    a power supply means coupled with the resonator for supplying power to the resonator; and
    a cooling system coupled with the resonator for cooling the resonator.

12. The invention in accordance with claim 11, wherein the laser includes a Q-switch mounted on the rail for providing high peak power pulses.

13. A reliable, light weight, low cost CW pumped Nd:YAG laser, in accordance with claim 12 wherein:
    said cooling system includes a reservoir containing substantially pure demineralized and deionized water, means for hydraulically coupling the reservoir with the resonator, and a heat exchanger immersed in the reservoir and having flowing therein cooling liquid, the heat exchanger including copper tubing and a coating on the exterior of the tubing for isolating the copper of the tubing from the pure water and thereby prevent ionic action therewith.

14. A reliable, light weight, low cost CW pumped Nd:YAG laser, in accordance with claim 12 wherein:
    the power supply comprises a lamp and current means for supplying current to the lamp, parallel triggering means for providing a stepped-up triggering pulse to the lamp and a transformerless circuitry, isolation means isolating the triggering pulse from the current that ignited the lamp and further isolating high level drive signals to the resonator.

15. The invention in accordance with claim 11, further including a transductor having a sensing end and a feedback end, an optical coupler coupled with the transductor, the isolation means isolating the sensing end and the feedback end.

16. The invention in accordance with claim 11, wherein the power supply is a non-isolated transformerless convertor.

* * * * *